(12) United States Patent
Fujihara

(10) Patent No.: US 11,814,697 B2
(45) Date of Patent: Nov. 14, 2023

(54) MARTENSITIC STAINLESS STEEL STRIP AND METHOD FOR PRODUCING SAME

(71) Applicant: Proterial, Ltd., Tokyo (JP)

(72) Inventor: Hiroyoshi Fujihara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 420 days.

(21) Appl. No.: 17/258,445

(22) PCT Filed: Jul. 10, 2019

(86) PCT No.: PCT/JP2019/027329
§ 371 (c)(1),
(2) Date: Jan. 7, 2021

(87) PCT Pub. No.: WO2020/013223
PCT Pub. Date: Jan. 16, 2020

(65) Prior Publication Data
US 2021/0292868 A1 Sep. 23, 2021

(30) Foreign Application Priority Data
Jul. 11, 2018 (JP) .................. 2018-131305

(51) Int. Cl.
*C21D 9/573* (2006.01)
*C22C 38/22* (2006.01)
(Continued)

(52) U.S. Cl.
CPC ............ *C21D 9/573* (2013.01); *C21D 1/18* (2013.01); *C21D 6/002* (2013.01); *C21D 6/005* (2013.01);
(Continued)

(58) Field of Classification Search
CPC ... C21D 1/18; C21D 1/25; C21D 1/26; C21D 1/60; C21D 1/667; C21D 2211/004; C21D 2211/008; C21D 2261/00; C21D 6/002; C21D 6/005; C21D 6/008; C21D 9/561; C21D 9/573; C22C 38/00; C22C 38/02; C22C 38/04; C22C 38/22
See application file for complete search history.

(56) References Cited

FOREIGN PATENT DOCUMENTS

| CN | 101936190 | 1/2011 |
| EP | 3031942 | 6/2016 |

(Continued)

OTHER PUBLICATIONS

"Office Action of China Counterpart Application", dated Jan. 10, 2022, with English translation thereof, p. 1-p. 18.
(Continued)

*Primary Examiner* — Jenny R Wu
(74) *Attorney, Agent, or Firm* — JCIPRNET

(57) ABSTRACT

A martensitic stainless steel strip capable of achieving higher fatigue strength. This martensitic stainless steel strip has a martensite structure and has a thickness of 1 mm or less, and is characterized in that the compressive residual stress at a surface of the steel strip is 50 MPa or more and the areal ratio of carbides present in the metal structure of the steel strip is 0.5-8.0%. The compressive residual stress at a surface of the steel strip is preferably such that the compressive residual stress in a direction perpendicular to rolling is at least 50 MPa greater than the compressive residual stress in the direction of rolling.

4 Claims, 2 Drawing Sheets

(51) Int. Cl.
*C22C 38/04* (2006.01)
*C22C 38/02* (2006.01)
*C21D 6/00* (2006.01)
*C21D 1/18* (2006.01)

(52) U.S. Cl.
CPC .............. *C21D 6/008* (2013.01); *C22C 38/02* (2013.01); *C22C 38/04* (2013.01); *C22C 38/22* (2013.01); *C21D 2211/004* (2013.01); *C21D 2211/008* (2013.01)

(56) References Cited

FOREIGN PATENT DOCUMENTS

| EP | 3348655 | | 7/2018 |
|---|---|---|---|
| EP | 3530769 | | 8/2019 |
| JP | S60121218 | | 6/1985 |
| JP | S61130455 | | 6/1986 |
| JP | H0448050 | | 2/1992 |
| JP | H10274161 | | 10/1998 |
| JP | 2007224405 | | 9/2007 |
| JP | 2008231517 | | 10/2008 |
| JP | 2011106332 | | 6/2011 |
| JP | 2012184471 | | 9/2012 |
| JP | 2015067873 | | 4/2015 |
| JP | 2015067873 A | * | 4/2015 |
| JP | 2018111881 | | 7/2018 |
| WO | 2018074271 | | 4/2018 |

OTHER PUBLICATIONS

Foreign Special Steel Production Technology Compilation Group, "Foreign Special Steel Production Technology (pressure processing part)," Shanghai Science and Technology Literature Publishing House, May 1982, pp. 1-4.

Personnel Service Center of China National Petroleum Corporation, "Forging Worker II," China University of Petroleum Press, Oct. 2006, pp. 1-3.

"Search Report of Europe Counterpart Application", dated Mar. 16, 2022, pp. 1-8.

M. Nystrom et al., "Impact Fatigue of Compressor Valve Steel", International Compressor Engineering Conference, Jan. 1996, pp. 511-516.

G. Chai et al., "Fatigue Behaviours of a Compressor Valve Stainless Steel With Small Amount of Retained Austenite", Paper at ICF10, Jan. 2001, pp. 1-7.

"International Search Report (Form PCT/ISA/210) of PCT/JP2019/027329", dated Oct. 1, 2019, with English translation thereof, pp. 1-4.

"Office Action of China Counterpart Application", dated Aug. 12, 2021, with English translation thereof, p. 1-p. 12.

Tam Mei Tian, "Microscopic Study of Metal Cutting," Shanghai Science and Technology Press, Apr. 1988, with partial English translation thereof, pp. 1-7.

"Office Action of China Counterpart Application", dated May 5, 2022, with English translation thereof, p. 1-p. 16.

* cited by examiner

MARTENSITIC STAINLESS STEEL STRIP AND METHOD FOR PRODUCING SAME

CROSS-REFERENCE TO RELATED APPLICATION

This application is a 371 application of the international PCT application serial no. PCT/JP2019/027329, filed on Jul. 10, 2019, which claims the priority benefit of Japan application no. 2018-131305, filed on Jul. 11, 2018. The entirety of each of the above-mentioned patent applications is hereby incorporated by reference herein and made a part of this specification.

TECHNICAL FIELD

The present invention relates to a martensitic stainless steel strip and a method for producing the same.

BACKGROUND ART

Martensitic stainless steel strips have excellent corrosion resistance, hardness, and fatigue characteristics and are used in a wide range of applications such as cutting tools, spring materials on which stress repeatedly acts, valve materials, and cover materials, for example. Particularly, for spring materials or valve materials, martensitic stainless steel strips having a sufficiently high fatigue strength are required in order to curb fatigue fracture caused by repeated stress.

In the related art, various proposals have been made in order to improve the fatigue strength of a martensitic stainless steel strip described above. For example, in order to obtain a steel strip for a spring in which a fatigue limit is further improved compared to that in the related art, Patent Literature 1 discloses a steel strip for a spring consisting of, in weight %, C: 0.35 to 0.45%, Si: 0.10 to 0.50%, Mn: 0.10 to 0.50%, Cr: 10 to 15%, Mo: 1.0 to 1.5%, P: 0.05% or less, S: 0.005% or less, O: 0.002% or less, N: 0.02% or less, Al: 0.005% or less, Ti: 0.01% or less, and substantially a residue of Fe, and having favorable durability.

In addition, in order to improve corrosion resistance and fatigue characteristics of a flapper valve body, Patent Literature 2 discloses a flapper valve body constituted of a martensitic stainless steel having compressive residual stress on a plate surface and having a solid solution nitrogen-concentrated layer in a plate surface part. Here, Patent Literature 2 also discloses that when rapid cooling is performed after heating to a temperature or higher for transformation to an austenitic single phase with an atmosphere including nitrogen of 20% or more and oxygen of 10% or less (including a case of 0%) (the percentage is volume %), residual stress on a surface of the martensitic stainless steel can be adjusted to compressive stress.

CITATION LIST

Patent Literature

[Patent Literature 1]
Japanese Patent Laid-Open No. H4-48050
[Patent Literature 2]
Japanese Patent Laid-Open No. H10-274161

SUMMARY OF INVENTION

Technical Problem

Recently, compressors for an air conditioner have become highly compressed, and valves used in compressors are also required to have improved fatigue strength characteristics in order to cope with high pressure. The invention of Patent Literature 1 is an invention capable of improving a fatigue limit of a steel strip. However, the fatigue limit may be insufficient depending on a usage environment, and there is still room for further improvement. In addition, also in the invention disclosed in Patent Literature 2, there is a possibility that simply adjusting residual stress may be insufficient for obtaining an excellent fatigue strength. In addition, the invention disclosed in Patent Literature 2 is an invention stipulating compressive residual stress caused by a nitrogen-concentrated layer formed on a plate surface. However, it is difficult to uniformly form a nitrogen-concentrated layer at an edge part and an outer circumferential part of a valve shape, and there is a possibility that a desired residual stress may not be obtained. Moreover, since a range for forming a nitrogen-concentrated layer also varies depending on a thickness of a material thereof, an amount of gas or a composition of gas has to be changed every time a plate thickness fluctuates, and there is concern of deterioration in productivity. Thus, the present invention provides a martensitic stainless steel strip having a superior fatigue strength to products in the related art, and a method for producing the same.

Solution to Problem

The present invention has been made in consideration of the problems described above.

That is, according to an aspect of the present invention, there is provided a martensitic stainless steel strip having a martensite structure and a thickness of 1 mm or smaller. Compressive residual stress on a surface of the steel strip is 50 MPa or greater. An area ratio of carbides present in a metal structure of the steel strip is within a range of 0.5% or more and 8.0% or less.

Preferably, regarding the compressive residual stress on a surface of the steel strip, compressive residual stress in a direction perpendicular to rolling is greater than compressive residual stress in a direction of rolling by 50 MPa or greater.

Preferably, when an area ratio of carbides having an equivalent circle diameter of 0.10 μm or larger is 100% of the carbides, an area ratio of carbides having an equivalent circle diameter within a range of 0.10 μm to 0.50 μm is 45% or more.

According to another aspect of the present invention, there is provided a method for producing a martensitic stainless steel strip including an unwinding step of unwinding a martensitic stainless steel strip having a thickness of 1 mm or smaller, a quenching step of threading and heating a steel strip in a quenching furnace with a non-oxidizing gas atmosphere and subsequently performing cooling, and a tempering step of threading and tempering a steel strip after quenching in a tempering furnace with a non-oxidizing gas atmosphere. The quenching furnace at a time of the quenching step has at least a temperature raising part and a holding part; when a predetermined quenching temperature is T (° C.), the temperature raising part is set within a temperature range of 0.7 T (° C.) or higher and lower than T (° C.); a set heating temperature on an output side of a steel strip is set to be higher than a set heating temperature on an input side of a steel strip when a steel strip is threaded through the temperature raising part; the holding part is set to the quenching temperature T (° C.); and an in-furnace staying time of a steel strip at the temperature raising part is equal to or longer than an in-furnace staying time of a steel strip at the holding part. The method for producing a martensitic stainless steel strip further includes a polishing step of polishing a surface of a steel strip after the tempering step through machining.

Preferably, when the in-furnace staying time of a steel strip at the temperature raising part is TS and the in-furnace staying time of a steel strip at the holding part is TH during the quenching step, TS/TH is greater than 1 and smaller than 5.

Advantageous Effects of Invention

According to the present invention, it is possible to obtain a martensitic stainless steel strip having a superior fatigue strength to products in the related art.

DESCRIPTION OF EMBODIMENT

Figure 1:
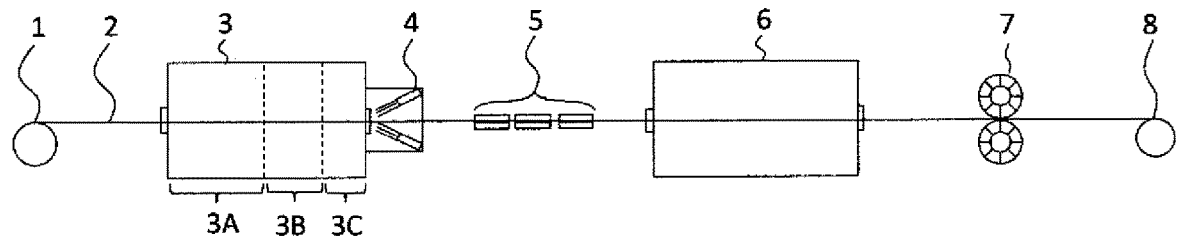
FIG. 1 is a view illustrating an example of an apparatus used for a producing method of the present invention.

Hereinafter, the present invention will be described in detail. However, the present invention is not limited to the embodiment stated herein and can be suitably combined or improved within a range not departing from the technical idea of the invention. The present invention can be applied to those having a composition of a martensitic stainless steel. A range for the composition is not limited. However, for example, the composition of components of a steel strip of the present invention preferably includes, in mass %, C: 0.3% to 1.2% and Cr: 10.0% to 18.0%. Moreover, regarding the composition of the components of the steel strip of the present invention, it is preferable that a martensitic stainless steel strip consist of C: 0.3% to 1.2% (more preferably 0.3% to 1.0% and further preferably 0.3% to 0.8%), Si: 1% or less, Mn: 2% or less, Mo: 3.0% or less (more preferably 2.5% or less and further preferably 2.0% or less), Ni: 1.0% or less (including 0%), Cr: 10.0% to 18.0% (more preferably 11.0% to 16.0% and further preferably 12.0% to 15.0%), Fe, and unavoidable impurities.

In the martensitic stainless steel strip of the present embodiment, compressive residual stress on a surface of the steel strip is 50 MPa or greater. Generally, if tensile residual stress is present on a surface of a steel strip, characteristics such as a fatigue strength tend to deteriorate. However, if compressive residual stress has been applied thereto, growth of micro-cracking formed at the time of hot rolling or the like can be curbed. Therefore, improvement in fatigue strength can be expected. When compressive residual stress is smaller than 50 MPa, there is a possibility that the form of residual stress may be tension depending on conditions of quenching and tempering, which is not preferable. The lower limit for preferable compressive residual stress is 80 MPa, and the lower limit for more preferable compressive residual stress is 100 MPa. In the present embodiment, the upper limit for compressive residual stress is not particularly stipulated. However, there is a possibility that producing costs may increase due to excessive adjustment of compressive residual stress, and thus it can be set to 800 MPa. It is preferably set to 700 MPa or smaller and more preferably set to 600 MPa or smaller. This compressive residual stress may be evaluated in any direction on a surface of a steel strip. However, it need only be evaluated in a direction of rolling (a longitudinal direction of a steel strip) and be 50 MPa or greater.

Moreover, in the present embodiment, it is preferable that compressive residual stress in a direction perpendicular to rolling on a surface of a steel strip be greater than compressive residual stress in the direction of rolling by 50 MPa or greater. Generally, in a cold rolling material, inclusions are likely to be distributed in a row shape in the direction of rolling, and a strength in a direction perpendicular to rolling tends to deteriorate further than a strength in the direction of rolling due to the influence thereof. In order to curb deterioration in strength in this direction perpendicular to rolling, it is effective to adjust compressive residual stress in a direction perpendicular to rolling to be higher than that in the direction of rolling. More preferably, it is preferable that compressive residual stress in a direction perpendicular to rolling be greater than that in the direction of rolling by 80 MPa or greater. Here, residual stress on a surface of the steel strip of the present embodiment can be measured by an X-ray diffraction method (XRD), for example. In the present embodiment, residual stress is measured using a $\sin^2\Psi$ method. A direction perpendicular to rolling indicates a direction perpendicular to the direction of rolling and corresponds to a width direction of an elongated steel strip when a length direction is the direction of rolling.

In the steel strip of the present embodiment, an area ratio of carbides present in a metal structure is 0.5% or more and 8.0% or less. Accordingly, progress of cracking can be curbed, and thus a steel strip having a high strength can be obtained. The area ratio of carbides may be evaluated using carbides having an equivalent circle diameter of 0.10 μm or larger. When the size of carbides is smaller than 0.10 μm, it is difficult to evaluate the carbides and no significant influence is applied to the characteristics of a steel strip because they are excessively small. In addition, there is a possibility that carbides having an excessively large size may become a starting point of fatigue fracture, and thus it is preferable that the size of the equivalent circle diameter of carbides be 5.0 μm or smaller. More preferably, the size thereof is 3.0 μm or smaller. In addition, if the area ratio of carbides is excessively low, there is a possibility that coarsening of crystal grains may be promoted due to overheating, and thus the area ratio of carbides is preferably 0.5% or more. The area ratio of carbides is more preferably 1.0% or more, and the area ratio of carbides is further preferably 1.5% or more. The area ratio of carbides in the present embodiment is obtained by observing a surface or a cross section of a steel strip at a magnification of 5,000 times using a scanning electron microscope (SEM) and calculating an area ratio from carbides which can be confirmed in a visual field of 25 μm×19 μm (475 μm²).

In the steel strip of the present embodiment, when the area ratio of carbides having an equivalent circle diameter of 0.10 μm or larger is 100% of the carbides, it is preferable that the area ratio of carbides having an equivalent circle diameter within a range of 0.10 μm to 0.50 μm (0.10 μm or larger and 0.50 μm or smaller) be 45% or more. The steel strip of the present embodiment has many carbides having a small equivalent circle diameter by adjusting the carbides within the range of these numerical values, and thus compared to steel strips in the related art including many carbides having a large equivalent circle diameter, it is possible to exhibit an advantage in that fatigue fracture starting from carbides is unlikely to occur. The area ratio thereof is preferably 50% or more. When the area ratio of carbides having an equivalent circle diameter within a range of 0.10 μm to 0.50 μm is less than 45%, there are many carbides having a large equivalent circle diameter, and thus a heat treatment hardness may become insufficient or fatigue fracture starting from carbides tends to occur.

The steel strip of the present embodiment can be applied to a martensitic stainless steel strip having a plate thickness of 1 mm or smaller. As the plate thickness becomes smaller, a defective shape tends to be more likely to occur due to heating at the time of quenching, and thus it is preferable to be applied to a martensitic stainless steel strip having a plate thickness of 0.5 mm or smaller. There is no need to particularly set the lower limit for the plate thickness. However, for example, if a steel strip produced through rolling has an excessively small plate thickness, there are difficulties in production, and thus the plate thickness can be set to approximately 0.01 mm. The lower limit for the plate thickness is more preferably 0.05 mm, and the lower limit for the plate thickness is further preferably 0.1 mm.

Subsequently, a producing method of the present invention will be described. The present invention is characterized in that an unwinding step, a quenching step, and a tempering step are performed and a polishing step of polishing a surface of a steel strip is performed after the tempering step. A quenching furnace used in the quenching step is characterized in that it is constituted of at least a temperature raising part and a holding part. In addition, a temperature lowering part may be provided after the holding part. In addition, the unwinding step, the quenching step, and the tempering step described above may be continuously performed, and other steps such as a preheating step can also be added, for example, as long as the effects of the present invention are not impaired. FIG. 1 illustrates an example of an apparatus layout of the present embodiment. Hereinafter, the producing method of the embodiment of the present invention will be described.

(Unwinding Step and Quenching Step)

First, in the present invention, in order to continuously perform quenching and tempering, a steel strip wound in a coil shape is mounted in an unwinder 1, and a steel strip 2 after rolling is unwound by the unwinder 1 (unwinding step). Thereafter, the steel strip 2 is threaded through a heating furnace (quenching furnace) 3 for heating with a non-oxidizing gas atmosphere. Subsequently, the steel strip is cooled (quenching step). As illustrated in FIG. 1, a temperature raising part 3A and a holding part 3B are installed in the quenching furnace 3 used in the present embodiment. In the quenching furnace 3 in FIG. 1, a temperature lowering part 3C is also provided after the holding part 3B. This temperature lowering part 3C is not essential, but it is preferably provided. In the present embodiment, the temperature raising part in which a set heating temperature is set to be lower than the quenching temperature is provided before the holding part for holding a threaded steel strip at a predetermined quenching temperature. In the temperature raising part, the set heating temperature on an output side of a steel strip is set to be higher than the set heating temperature on an input side of a steel strip when a steel strip threads the temperature raising part. Specifically, the quenching step of the present embodiment has the temperature raising part in which the set heating temperature on the output side of a steel strip is set to be higher than the set heating temperature on the input side of a steel strip when a steel strip threads the temperature raising part within a temperature range of 0.7 T (° C.) or higher and lower than T (° C.) when the predetermined quenching temperature is T (° C.), and the holding part which is set at the quenching temperature T (° C.) thereafter. By performing heating in the quenching step under the foregoing conditions, it is possible to achieve effects such as curbing having a defective shape due to rapid heating without reducing a threading speed of a steel strip, controlling the size of carbides, and decreasing the area ratio of carbides. A preferable lower limit for the set heating temperature at the temperature raising part is 0.8 T (° C.). When the set heating temperature at the temperature raising part is lower than 0.7 T (° C.), there is a possibility that the temperature of a steel strip may not be raised to a desired temperature within a desired time and characteristics may deteriorate. When the set heating temperature at the temperature raising part is T (° C.) or higher, a steel strip may be rapidly heated, and thus a possibility of occurrence of a defective shape increases. Here, in the present embodiment, when a time required for a steel strip to pass through the quenching furnace (in FIG. 1, a time to pass through the quenching furnace 3 (a time from when a steel strip enters the temperature raising part 3A until it comes out of the temperature lowering part 3C)) is M1 [min] and the plate thickness of the steel strip is t [mm], it is preferable to adjust M1/t within 4 to 8. For example, the foregoing M1/t may be adjusted such that a steel strip passes through the quenching furnace 3 within 1.2 to 2.4 min as the time required to pass through the quenching furnace when the plate thickness is 0.3 mm. By adjusting M1/t to these numerical values, the defective shape curbing effect of the present invention can be reliably achieved. Here, for example, in order to prevent sudden change in temperature, the set heating temperature at the temperature raising part may be set such that the set heating temperature rises in stages from the input side of a steel strip to the output side of a steel strip at the temperature raising part.

The present embodiment is also characterized in that an in-furnace staying time of a steel strip at the temperature raising part is equal to or longer than an in-furnace staying time of a steel strip at the holding part. Accordingly, rapid progress of heating of a steel strip can be curbed, and thus occurrence of a defective shape can be further curbed. When the in-furnace staying time of a steel strip at this temperature raising part is excessively longer than the in-furnace staying time of a steel strip at the holding part, the in-furnace staying time of a steel strip at the holding part may become insufficient so that a steel strip may not reach a desired quenching temperature, there may be a possibility that desired characteristics may not be obtained after quenching, it may take time until the temperature reaches a desired quenching temperature, and thus there is a possibility that productivity may deteriorate. When the in-furnace staying time of a steel strip at the temperature raising part is shorter than the in-furnace staying time of a steel strip at the holding part, the time at the holding part becomes excessively long, and thus there is a possibility that a defective shape may be caused due to overheating of a steel strip. Therefore, when the in-furnace staying time of a steel strip at the temperature raising part is TS and the in-furnace staying time of a steel strip at the holding part is TH, it is preferable that TS/TH be larger than 1 and smaller than 5. Moreover, it is preferably larger than 1.3 and preferably smaller than 4.

In the present embodiment, it is preferable that the set heating temperature at the holding part be within a range of 850° C. to 1,200° C. When it is lower than 850° C., a solid solution of carbides tends to become insufficient. In contrast, when it exceeds 1,200° C., the amount of solid solution of carbides increases, and thus the hardness at the time of tempering tends to deteriorate. The lower limit for the temperature at the holding part is more preferably 900° C. and further preferably 930° C. The upper limit for the temperature at the holding part is more preferably 1,150° C. and further preferably 1,120° C. In addition, regarding the kinds of non-oxidizing gas, nitrogen, argon, hydrogen-mixed gas, or the like can be selected, but it is preferable to select argon which is less likely to react to a martensitic stainless steel strip.

In the present embodiment, the temperature lowering part in which the temperature is set to be lower than the set heating temperature at the holding part and lowering of the temperature of a steel strip is controlled may be provided after the holding part. By providing this temperature lowering part, cooling can be performed after the temperature of a steel strip before cooling is lowered to a certain degree instead of immediately cooling a steel strip which has come out of the holding part, and thus an effect of curbing damage to the apparatus during the cooling step or the like can be expected. It is preferable that the set heating temperature at this temperature lowering part be within a range of 0.85 T (° C.) or higher and lower than T (° C.) with respect to the set heating temperature T (° C.) at the holding part. It is more preferable that it be 0.95 T (° C.) or lower. It is preferable that the in-furnace staying time (required time) of a steel strip at this temperature lowering part be within a range of 10% to 30% of a time M1 required for a steel strip to pass through the quenching furnace.

The quenching furnace of the present embodiment can also be constituted of a plurality of quenching furnaces (two or more furnaces). At this time, the temperature raising part having a heat source, the holding part, and the temperature lowering part may be set in each one of the furnaces (the furnaces are not continuously disposed). Alternatively, the temperature raising part may be set in one furnace, and the holding part and the temperature lowering part may be set in the other furnace. Preferably, the temperature raising part and the holding part described above are provided in one quenching furnace in which space-saving can be achieved and no temperature change occurs between furnaces. In addition, a gas burner, an electric heater, or the like can be used as the heat source of the quenching furnace of the present embodiment.

In the present invention, in order to further improve the production efficiency, a preheating step may be provided between the unwinding step and the quenching step. An existing heating apparatus can be applied in the preheating step (not illustrated), but it is preferable to use an induction heating apparatus capable of rapidly raising the temperature of a steel strip.

In addition, in order to realize effective preheating, it is preferable to set a preheating temperature at the time of the preheating step to 600° C. or higher. On the other hand, in order to more reliably curb deformation due to a sudden temperature rise, it is preferably set to a temperature lower than 800° C.

Subsequently, quenching is performed by rapidly cooling a steel strip heated in the quenching furnace. Regarding a method for rapid cooling, there are methods of using a salt bath, a molten metal, oil, water, a polymer aqueous solution, and a saline solution. Among these, a method of spraying water is the simplest method and can form a thin oxide film on a surface of a steel strip. This thin oxide film is hard and can curb occurrence of a defect on a surface of a steel strip when it threads a water-cooling surface plate 5 (which will be described below). For this reason, it is preferable to use the method of spraying water as a means for rapidly cooling the steel strip 2 used in the present invention.

In addition, in rapid cooling during the quenching step, it is preferable to obtain a martensite structure by performing a first cooling step of cooling the steel strip 2 to 350° C. or lower beyond an Ms point by spraying apparatus 4 using compressed air and water, and thereafter performing a second cooling step of restraining the steel strip in the water-cooling surface plate 5 such that it is sandwiched and cooling the steel strip to the Ms point or lower while correcting the shape thereof. Cooling is performed in two stages because pearlite nose can be avoided in the first cooling step, distortion occurring at the time of quenching the steel strip 2 can be reduced, martensitic transformation can be induced in the following second cooling step, and the shape of the steel strip 2 can be straightened. It is preferable that the water-cooling surface plate 5 used in the present embodiment be cooled using water and a plurality of water-cooling surface plates be continuously disposed. This is because a restraint time inside the water-cooling surface plate can be lengthened, and thus a steel strip can be more reliably cooled to the Ms point or lower. Accordingly, it is possible to expect that deformation of the steel strip 2 is prevented and correction is performed more reliably.

(Tempering Step)

After the quenching step, a steel strip is tempered in a tempering furnace 6 with a non-oxidizing gas atmosphere, and the steel strip is adjusted to have a desired hardness. The temperature of this tempering furnace can be set to a desired temperature depending on the purpose thereof. For example, when characteristics having a greater hardness are necessary, the temperature can be set within a range of 200° C. to 300° C. In addition, in order to achieve better shape workability such as press working, the temperature can also be set within a range of 300° C. to 400° C. If the threading speed in the tempering step is excessively fast, there is a possibility that the temperature may not reach the range described above. Therefore, when a time required for a steel strip to pass through the tempering furnace is M2 [min] and the plate thickness of the steel strip is t [mm], it is preferable to set M2/t within 5 to 9.

(Polishing Step)

Subsequently, the polishing step of polishing a surface of a steel strip after the tempering step is performed using a polishing apparatus 7. In the present embodiment, due to this polishing step, scale in a surface layer of a steel strip can be removed, and compressive residual stress can be stably applied to a surface of a steel strip. In a cold rolling step before quenching, even if compressive residual stress is applied to a surface of a steel strip through cold rolling, when annealing is performed after final rolling or quenching and tempering are performed, a stress distribution may vary and tensile residual stress may be applied to the surface layer of a steel strip. Regarding a method for applying compressive residual stress again to a steel strip after quenching and tempering, there is polishing such as shot peening or shot blasting using a projection material, but it is difficult to uniformly perform processing throughout the width of a steel strip and tends to cause high costs. For this reason, in the polishing step according to the present embodiment, a polishing step of performing polishing through machining represented by grindstone polishing, belt polishing, brush polishing, buff polishing, and the like is applied. Preferably, by applying buff polishing, scale in the surface layer can be removed, and the residual stress can be easily adjusted to a desired residual stress without causing significant damage to a surface of a steel strip. When buff polishing is applied, regarding a material of a buff, a buff using cotton, existing chemical fibers such as polyester, or linen fibers can be applied. In order to enhance and maintain a polishing force, a buff may be impregnated or subjected to spraying with a polishing material such as alumina or silica. This polishing step may be continuously performed with respect to a steel strip after tempering, or only the polishing step may be performed by temporarily winding a steel strip after tempering and unwinding the steel strip again in another line. After the polishing step, a martensitic stainless steel strip having a desired fatigue strength can be obtained by winding the steel strip using a winder 8.

EXAMPLES

Example 1

First, martensitic stainless steel strips having a width of approximately 300 mm and a thickness of 0.2 mm were prepared. Table 1 shows the composition thereof. The prepared steel strips were wound in a coil shape, and they were set in the unwinder 1. The steel strips were unwound using an unwinder, and the unwound steel strips threaded the quenching furnace with an argon gas atmosphere. The quenching furnace was constituted of the temperature raising part 3A, the holding part 3B, and the temperature lowering part 3C. The set heating temperature of the temperature raising part 3A was set such that the set heating temperature gradually increased toward the holding part at a temperature at the holding part or lower and within a range of 800° C. or higher and lower than 1,040° C. The temperature at the holding part 3B was set within a range of 1,040° C. to 1,100° C., and the temperature at the temperature lowering part 3C was set within a range of 950° C. or higher and lower than 1,040° C. The threading speed of each of the steel strips was adjusted such that M1/t became approximately 6 when a time for the steel strip to pass through the quenching furnace (a time from when the steel strip entered the temperature raising part 3A of the quenching furnace 3 and until it came out of the temperature lowering part 3C) was M1 [min] and the plate thickness of the steel strip was t [mm]. Subsequently, using the spraying apparatus 4 of a cooling liquid installed on the output side of the quenching furnace, primary cooling was performed by spraying pure water to the steel strip, and the steel strip was cooled to a temperature within a range of 290° C. to 350° C. Thereafter, a secondary cooling step of pressing the steel strip in the water-cooling surface plate 5 was performed and the steel strip was cooled to 100° C. or lower. Thereafter, the steel strip threaded the tempering furnace 6 with an argon gas atmosphere by adjusting the threading speed such that M2/t became approximately 7 when a time for the steel strip to pass through the tempering furnace was M2 [min] and the plate thickness of the steel strip was t [mm]. Tempering was performed by setting the temperature of the tempering furnace within 250° C. to 300° C. Moreover, the steel strip after tempering was subjected to machine polishing such as buff polishing, the steel strip was wound by the winder, and a martensitic stainless steel strip of an example of the present invention was prepared. Here, the example of the present invention was adjusted such that a required time for the temperature raising part (the in-furnace staying time of a steel strip) became 50%, a required time for the holding part became 34%, and a required time for the temperature lowering part became 16% when the time M1 required for a steel strip to pass through the quenching furnace was stipulated as 100%. In contrast, in a martensitic stainless steel strip of Comparative Example 11, all the processing of heating at the time of the quenching step was performed in the holding part, the set heating temperature was within a range of 1,040° C. to 1,100° C., and the tempering temperature was within a range of 320° C. to 370° C.

TABLE 1

| (mass %) | | | | | |
|---|---|---|---|---|---|
| C | Si | Mn | Cr | Mo | Residue |
| 0.39 | 0.30 | 0.31 | 13.37 | 1.23 | Fe and unavoidable impurities |

Figure 3:
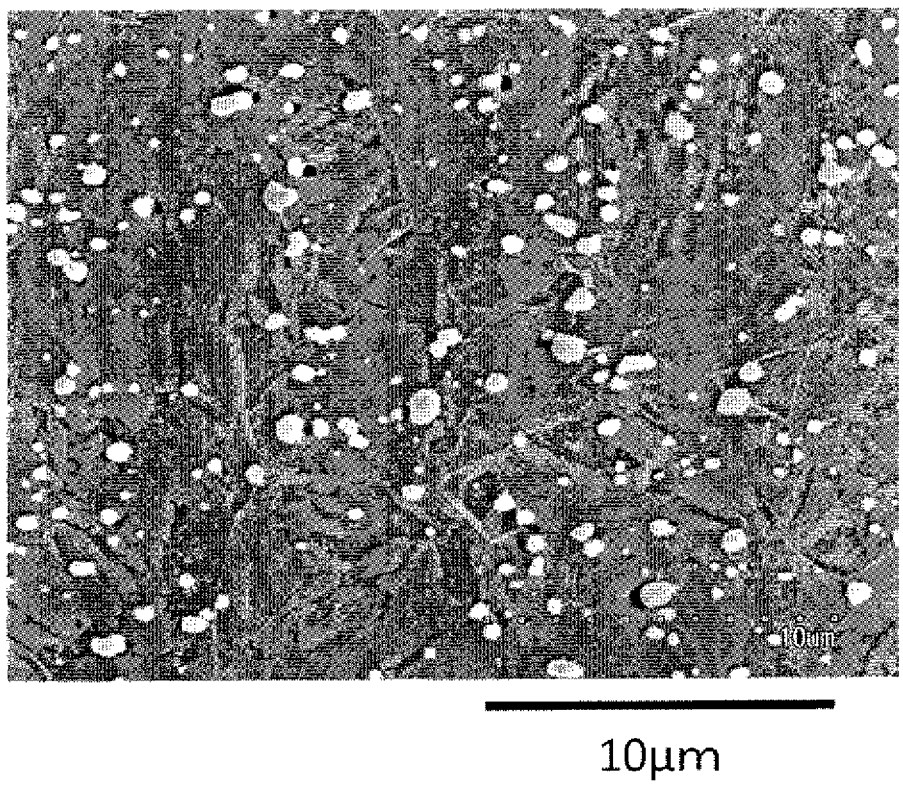
FIG. 3 is a scanning electron micrograph showing a cross section of an example of the present invention.

Subsequently, cross sections of the prepared steel strips of Example 1 of the present invention and Comparative Example 11 were observed at a magnification of 5,000 times using a scanning electron microscope (SEM), and carbides in a visual field of 25 μm×19 μm (475 μm$^2$) were observed. FIG. 3 shows a photograph of a cross section of Example 1 of the present invention observed at a magnification of 5,000 times using a scanning electron microscope (SEM). In addition, Table 2 shows results of observation and measurement of the carbides. Here, in Table 2, "Area ratio (%) of carbides (all carbides)" indicates the proportion of the area of carbides having an equivalent circle diameter of 0.1 μm or larger in an area (475 μm$^2$) in an observation visual field, and "Area ratio of carbides (%) (0.1 μm to 0.5 μm)" indicates the proportion of the area of carbides having an equivalent circle diameter within a range of 0.1 μm to 0.5 μm in an area (475 μm$^2$) in an observation visual field. In addition, "Proportion of carbides having equivalent circle diameter of 0.1 to 0.5 μm" was derived out by dividing the value of the area ratio of carbides (%) (equivalent circle diameter of 0.1 to 0.5 μm) by value of the area ratio (%) of carbides (all carbides). In both Example 1 of the present invention and Comparative Example 11, carbides having an equivalent circle diameter exceeding 5.0 μm in the foregoing observation visual field were not observed.

TABLE 2

| Sample No. | Area ratio (%) of carbides (all carbides) | Area ratio of carbides (%) (equivalent circle diameter of 0.1 μm to 0.5 μm) | Proportion of carbides having equivalent circle diameter of 0.1 to 0.5 μm |
|---|---|---|---|
| Example 1 of present invention | 5.72 | 3.01 | 53% |
| Comparative Example 11 | 8.87 | 3.80 | 43% |

As shown in Table 2, the steel strip of Example 1 of the present invention had fewer carbides than the steel strip of Comparative Example 11. Moreover, regarding the formed carbides, it could be confirmed that Example 1 of the present invention had a larger proportion of carbides having an equivalent circle diameter of 0.1 to 0.5 μm. Subsequently, the Vickers hardness, the tensile strength, and the fatigue limit of Example 1 of the present invention and Comparative Example 11 were measured. The Vickers hardness was obtained from an average value of the hardness at three places in accordance with the method stipulated in JIS-Z2244, and the load was set to 5 kg. In addition, the tensile strength was measured in accordance with the method stipulated in JIS-Z2241, and JIS No. 13 B test pieces were used as the test pieces. Regarding the fatigue limit, a completely reversed bending fatigue test of a stress amplitude constant (repeated 2×10$^6$ times at a stress ratio R=−1) complying with the standard of the Japan Society of Mechanical Engineers JSME S 002-1994 was performed, and the stress having a rupture probability of 50% during $2 \times 10^6$ times was adopted as the fatigue limit. Table 3 shows the results thereof. From the results of Table 3, it could be confirmed that the sample of Example 1 of the present invention exhibited higher values for the hardness and the tensile strength and was also superior in the fatigue limit to the sample of Comparative Example 11. Accordingly, it could be seen that the steel strip of the present invention had an excellent fatigue strength. For this reason, it is suitable for the purpose of products requiring a high fatigue strength.

TABLE 3

| Sample No. | Hardness (HV) | Tensile strength (N/mm2) | Fatigue limit (N/mm2) |
| --- | --- | --- | --- |
| Example 1 of present invention | 610 | 2012 | 1458 |
| Comparative Example 11 | 565 | 1788 | 1317 |

Example 2

Figure 2:
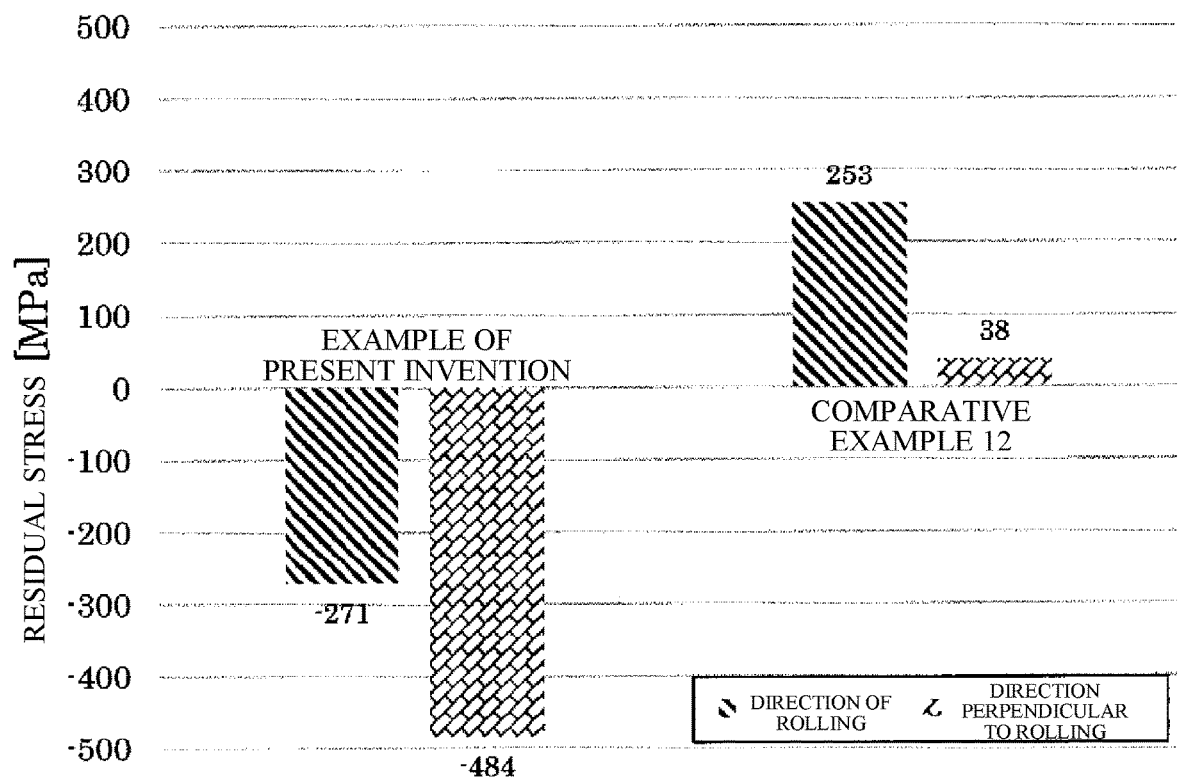
FIG. 2 is a graph illustrating results of residual stress measurement of Example 1 of the present invention and Comparative Example 12.

Subsequently, change in residual stress due to the presence or absence of the polishing step was investigated. The residual stress in the surface layer of the steel strip of Example 1 of the present invention prepared in Example 1, and the residual stress in the surface layer of the steel strip in Comparative Example 12 were measured and compared, wherein in Comparative Example 12, the polishing step was not conducted, while other conditions were equivalent to the conditions of the example of the present invention. Regarding the method for measuring the residual stress, a cut sample was measured using an X-ray stress measuring device ($\sin^2\Psi$ method). FIG. 2 shows the measurement results. In FIG. 2, in order to describe the residual stress of tension and compression in an easy-to-understand manner, the compressive residual stress was indicated with a negative value (marked with "−"), and the tensile residual stress was indicated with a positive value (marked with "+"). However, in this specification, the compressive residual stress is indicated with a positive value instead of a negative value. As illustrated in FIG. 2, a slight tensile residual stress was applied in Comparative Example 12, whereas a significant compressive residual stress was applied in Example 1 of the present invention, and thus it could be confirmed that the invention was suitable for the purpose requiring a higher fatigue strength.

The invention claimed is:

1. A martensitic stainless steel strip having a martensite structure and a thickness of 1 mm or smaller,
    wherein compressive residual stress on a surface of the martensitic stainless steel strip is 50 MPa or greater, and compressive residual stress in a direction perpendicular to rolling is greater than compressive residual stress in a direction of rolling by 50 MPa or greater, and
    wherein an area ratio of carbides present in a metal structure of the martensitic stainless steel strip is 0.5% or more and 8.0% or less.

2. The martensitic stainless steel strip according to claim 1,
    wherein when carbides having an equivalent circle diameter of 0.10 μm or larger is 100%, the carbides having an equivalent circle diameter within a range of 0.10 μm to 0.50 μm is 45% or more.

3. A method for producing a martensitic stainless steel strip comprising:
    an unwinding step of unwinding a martensitic stainless steel strip having a thickness of 1 mm or smaller;
    a quenching step of threading and heating the steel strip in a quenching furnace with a non-oxidizing gas atmosphere and subsequently performing cooling; and
    a tempering step of threading and tempering the steel strip after the quenching step in a tempering furnace with a non-oxidizing gas atmosphere,
    wherein the quenching furnace at a time of the quenching step has at least a temperature raising part and a holding part; when a predetermined quenching temperature is T° C., the temperature raising part is set within a temperature range of 0.7 T° C. or higher and lower than T° C.; a set heating temperature on an output side of the steel strip is set to be higher than a set heating temperature on an input side of the steel strip when the steel strip is threaded the temperature raising part; the holding part is set to the quenching temperature T° C.; and an in-furnace staying time of the steel strip at the temperature raising part is equal to or longer than an in-furnace staying time of the steel strip at the holding part,
    wherein the method for producing a martensitic stainless steel strip further comprises a polishing step of polishing a surface of the steel strip after the tempering step through machining,
    the martensitic stainless steel strip has a martensite structure and a thickness of 1 mm or smaller,
    compressive residual stress on a surface of the martensitic stainless steel strip is 50 MPa or greater, and compressive residual stress in a direction perpendicular to rolling is greater than compressive residual stress in a direction of rolling by 50 MPa or greater, and
    an area ratio of carbides present in a metal structure of the martensitic stainless steel strip is 0.5% or more and 8.0% or less.

4. The method for producing a martensitic stainless steel strip according to claim 3,
    wherein when the in-furnace staying time of the steel strip at the temperature raising part is TS and the in-furnace staying time of the steel strip at the holding part is TH during the quenching step, TS/TH is greater than 1 and smaller than 5.

* * * * *